2,999,009
PURIFICATION OF MAGNESIUM NITRATE DEHYDRATING SOLUTION EMPLOYED IN NITRIC ACID MANUFACTURE

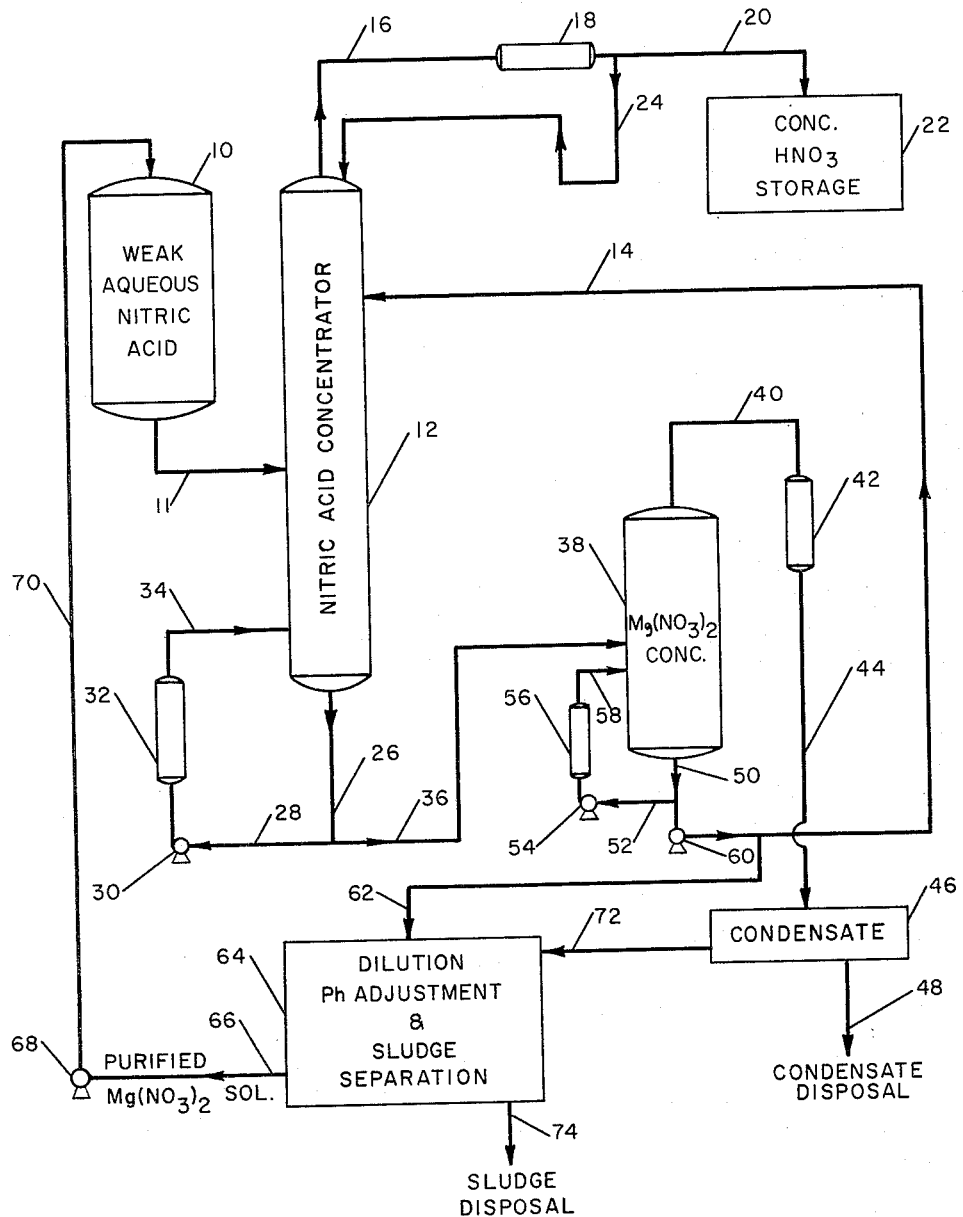
ROBERT J. BECHTEL,
ROBERT M. BROOKS,
INVENTORS
BY Ernest J. Peterson
AGENT.

Robert J. Bechtel, South River, and Robert M. Brooks, Milltown, N.J., assignors to Hercules Powder Company, Wilmington, Del., a corporation of Delaware
Filed Sept. 5, 1958, Ser. No. 759,280
7 Claims. (Cl. 23—160)

This invention relates to a process for purification of magnesium nitrate solution used as dehydrating agent in the continuous concentration of nitric acid. More particularly this invention relates to a process for effectively removing accumulated nonvolatile contaminants from the magnesium nitrate solution used as dehydrating agent in the continuous manufacture of concentrated nitric acid.

It is known that weak aqueous nitric acid can be dehydrated with concentrated magnesium nitrate solution to prepare concentrated nitric acid of 98–100% strength. In this process weak aqueous nitric acid of not more than about 68% concentration is fractionally distilled in the presence of concentrated magnesium nitrate solution of about 60–80% concentration in a fractionating column. Concentrated nitric acid of 98–100% concentration is taken off overhead from the fractionating column, and aqueous magnesium nitrate solution more dilute than the magnesium nitrate solution employed in the fractionation is taken off as a bottoms product from the bottom of the fractionating column. The diluted magnesium nitrate solution is then reconcentrated to 60–80% magnesium nitrate content under reduced pressure, and the reconcentrated magnesium nitrate solution is then recycled to the nitric acid concentration step. Commercially these operations are performed continuously, and it is apparent that the magnesium nitrate solution therefore circulates in an essentially closed system.

It has been found that in a commercial nitric acid plant utilizing the magnesium nitrate process of concentration there is a gradual accumulation of nonvolatile contaminants in the magnesium nitrate solution and these accumulated contaminants apparently interfere in some way (not clearly understood) with the dehydrating function of the magnesium nitrate solution. A point is finally reached where the plant cannot be operated even at reduced rates because of accumulated contaminants in the magnesium nitrate solution. The contaminated magnesium nitrate solution must then be purified by removing the contaminants, or discarded and fresh solution prepared. Obviously the latter practice is not economically feasible.

The contaminants have been identified as consisting chiefly of multivalent metal salts, including, but not necessarily limited to, salts of iron, aluminum, chromium, silicon, copper, manganese, nickel, calcium and lead. Antimony, arsenic, and other materials may also be present. These contaminants can enter the nitric acid concentration system as dissolved solids in the weak nitric acid supply, or in make-up magnesium nitrate solution, or can result from corrosion within the system. Since the magnesium nitrate solution circulates in an essentially closed system, it is clear therefore why any nonvolatile contaminants introduced into, or generated within the system, accumulate in the magnesium nitrate solution to a level where they interfere with the nitric acid concentration process.

Accordingly, it is an object of this invention to remove accumulated nonvolatile impurities from magnesium nitrate solution used as the dehydrating agent in the continuous concentration of nitric acid.

It is a further object of this invention to effect the purification of the contaminated magnesium nitrate dehydrating agent in such a manner that the purification does not interrupt the continuity of operation of the nitric acid concentration system.

These objects and others are accomplished in accordance with the present invention which, generally described, comprises withdrawing magnesium nitrate solution contaminated with nonvolatile impurities from the nitric acid concentration system, diluting the withdrawn solution with water to obtain a dilute magnesium nitrate solution containing not more than about 30% by weight of magnesium nitrate, and to obtain a pH value between 2 and 6, separating purified magnesium nitrate solution from the precipitate which forms in the resulting diluted magnesium nitrate solution, and recycling the purified magnesium nitrate solution to the nitric acid concentration system.

An embodiment of the invention has been chosen for purposes of illustration and description, and is shown in the accompanying diagrammatic drawing illustrating the invention in relation to a continuous nitric acid concentration system.

With reference to the drawing, weak aqueous nitric acid containing not more than 68% by weight $HNO_3$ from storage tank 10 is continuously passed via line 11 to nitric acid concentrator 12 which is a fractionating column. Concentrated magnesium nitrate solution of about 60–80% by weight magnesium nitrate concentration is simultaneously and continuously passed via line 14 to nitric acid concentrator 12. Concentrated nitric acid vapors of about 98–100% $HNO_3$ content are taken off overhead via line 16, are condensed in condenser 18, and pass via line 20 to concentrated nitric acid storage 22. Part of the concentrated nitric acid product is recycled as reflux via line 24 to nitric acid concentrator 12. In general, the ratio of concentrated magnesium nitrate solution to weak aqueous nitric acid is preferably about 4.5–5.0 to 1 by weight, and the reflux ratio of concentrated nitric acid recycled to the nitric acid concentrator is between about 1.1 and 3.5 parts by weight to each part withdrawn to storage.

Aqueous magnesium nitrate solution more dilute than the concentrated magnesium nitrate solution employed in the dehydration of weak aqueous nitric acid is taken off as a bottoms product from nitric acid concentrator 12 via line 26. A portion thereof is passed via line 28 and pump 30 to reboiler 32 where it is heated, and it is then returned to nitric acid concentrator 12 via line 34 to provide the necessary heat for the fractional distillation procedure. The remainder of the bottoms product from nitric acid concentrator 12 withdrawn via line 26 is passed via line 36 to magnesium nitrate solution concentrator 38 which is a vacuum evaporator wherein a portion of the water and remaining traces of nitric acid are evaporated from the magnesium nitrate solution, and are withdrawn overhead via line 40 and condensed in condenser 42. The condensate then passes via line 44 to condensate collecting vessel 46, and leaves the system via line 48. For convenience, this condensate is termed "acidic condensate" because it contains a small amount, on the order of about 0.3% to about 0.9% of nitric acid, which is too low for economic recovery. Concentrated magnesium nitrate solution of about 60–80% by weight magnesium nitrate from vacuum evaporator 38 is taken off as a bottoms product via line 50, and a portion thereof is passed via line 52 and pump 54 to reboiler 56 where it is heated, and is then returned to vacuum evaporator 38 via line 58 to provide the necessary heat for the vacuum evaporation procedure. The remainder of the concentrated magnesium nitrate solution withdrawn from vacuum evaporator 38 via line 50 is recycled via pump 60 and line 14 to nitric acid concentrator 12.

At periodic intervals, as necessary and desired, a portion of the magnesium nitrate solution containing accumulated contaminants is withdrawn from the system via line 62 to a suitable vessel 64 where the withdrawn solution is diluted with water to a magnesium nitrate content less than about 30% by weight, preferably between about 18% and about 30%. Acidic condensate from condensate collecting vessel 46 is conveniently employed to dilute the contaminated magnesium nitrate solution in vessel 64, and is introduced thereinto via line 72. The pH of the diluted magnesium nitrate solution is adjusted to a value between 2 and 6, preferably between 3 and 6, employing a basic magnesium compound as required, the solution being thoroughly agitated to insure thorough and uniform mixing. The diluted and pH adjusted solution is allowed to remain undisturbed for several hours during which the precipitated contaminants settle out as a dark colored sludge or sediment. The amount of these contaminants is usually on the order of about 0.2% to about 0.8% by weight, based on the weight of magnesium nitrate in the solution. The clarified, purified magnesium nitrate solution from vessel 64 is then passed via line 66, pump 68 and line 70 to weak aqueous nitric acid storage tank 10 where it is mixed with the supply of weak aqueous nitric acid, and is returned to the nitric acid concentration system mixed with weak aqueous nitric acid via line 11 to nitric acid concentrator 12. Sludge is removed via line 74.

In the illustrated embodiment of the invention set forth in the drawing, the magnesium nitrate solution is shown as being withdrawn from line 14 leading to nitric acid concentrator 12. The invention is by no means limited in this respect, however, since the magnesium nitrate solution can be withdrawn from the nitric acid concentration system for purification at any convenient point in the salt circulation portion of the system. More specifically, the magnesium nitrate solution can be withdrawn from any convenient point in the lines leading from the bottom of nitric acid concentrator 12 to magnesium nitrate solution concentrator 38, from magnesium nitrate solution concentrator 38, from the reboiler systems associated with either the nitric acid concentrator 12 or magnesium nitrate solution concentrator 38, from the lines leading from the bottom of magnesium nitrate solution concentrator 38 to nitric acid concentrator 12, or from the base of nitric acid concentrator 12.

In the preferred practice of this invention, the quantity of contaminated magnesium nitrate solution in process of purification at any one time and the rate of withdrawal should be low enough so as not to upset the continuous operation of the nitric acid concentration system. Accordingly, in preferred practice, the amount of magnesium nitrate solution in process of purification at any one time should contain not more than about 10% of the total magnesium nitrate in the nitric acid concentration system, and preferably should contain between about 3% and about 5% of the total amount of magnesium nitrate in said system.

It has been found in practice that the concentration of contaminants in the concentrated magnesium nitrate dehydrating solution can be kept well below the level where they interfere with the dehydrating function of the magnesium nitrate solution by conducting the purification and reintroduction of the purified solution on successive portions of the magnesium nitrate solution at intervals, as found necessary. Stated differently, it has been found in practice that the continuity of the nitric acid concentration process can be satisfactorily maintained by performing the purification process of this invention, including withdrawal of contaminated solution, dilution thereof with water, adjustment of pH, separation of purified solution from precipitated impurities, and return of purified solution to the nitric acid concentration system, on successive portions of the magnesium nitrate solution at sufficiently frequent intervals to maintain the concentration of contaminating impurities well below the level where they interfere with the dehydrating function of the magnesium nitrate solution. Plant operational data are sufficient criteria on which to base determination of the necessary frequency for repeating the purification process of this invention on successive portions of the magnesium nitrate dehydrating solution. For example, the continuity of the nitric acid concentration process can be satisfactorily maintained by purifying a portion of magnesium nitrate solution containing not more than about 10%, and preferably between about 3% to about 5% by weight of magnesium nitrate based on the total magnesium nitrate in the nitric acid concentration system, once each day that the plant is in operation. However, the invention is not limited in this respect, since the purification and reintroduction of the purified solution can be satisfactorily performed continuously, the only requirement for continuity of operation of the nitric acid concentration system being that the quantity of magnesium nitrate in process of purification at any one time should not exceed about 10% of the total magnesium nitrate in the nitric acid concentration system.

More specifically, the invention can be practiced by continuously withdrawing magnesium nitrate solution contaminated with nonvolatile impurities from the nitric acid concentration system, continuously diluting the withdrawn solution with water to obtain a dilute magnesium nitrate solution containing not more than about 30% by weight of magnesium nitrate, and to obtain a pH value between 2 and 6, continuously separating purified magnesium nitrate solution from the precipitate which forms in the resulting diluted magnesium nitrate solution, and continuously recycling the purified magnesium nitrate solution to the nitric acid concentration system, the quantity of contaminated magnesium nitrate in process of purification at any one time being not more than about 10% of the total magnesium nitrate in the nitric acid concentration system.

Whereas the preferred practice of this invention has been dealt with hereinabove, it should be understood that the invention is not limited to the hereinabove preferred embodiments, since the invention can be practiced by purifying any portion or all of the contaminated magnesium nitrate in the nitric acid concentration system at any one time, as convenient or desired. However, when more than 10% of the contaminated magnesium nitrate is withdrawn for purification at one time, and it is desired to maintain continuous operation of the nitric acid concentration system, then provision must be made to replace the withdrawn contaminated salt with an equivalent amount of fresh, uncontaminated magnesium nitrate. The withdrawn contaminated salt, after purification, is then held in reserve to replace contaminated salt withdrawn for purification in future repetitions of the invention.

There are also situations when it is convenient to purify all of the magnesium nitrate dehydrating agent at one time. For example, at intervals when the nitric acid concentration system is shut down for repairs, it will be found convenient to withdraw all of the magnesium nitrate dehydrating agent from the system, purify the same by dilution and pH adjustment in accordance with this invention, and return the purified solution to the nitric acid concentration system upon start up of the plant again.

As the magnesium nitrate solution is withdrawn from the nitric acid concentration system, it is mixed with water in a suitable vessel with agitation to insure thorough mixing to obtain a dilute magnesium nitrate solution containing not more than about 30% by weight of magnesium nitrate, and preferably between about 18% and about 30% by weight of magnesium nitrate. Although more dilute solutions than 18% by weight of magnesium nitrate can be employed in practicing this invention, such dilution is less economical, since this involves removing a greater quantity of water by evaporation in order to reconcentrate the magnesium nitrate solution back to dehydrating strength. Solutions more concentrated than 30% by weight of magnesium nitrate tend to crystallize upon cooling, and a considerable amount of contaminants remain in solution and do not precipitate.

The water employed to dilute the magnesium nitrate solution should be substantially free of ions or compounds which could contaminate the magnesium nitrate in a manner to interfere with its dehydrating function. For this reason, therefore, it is preferred that the water should be demineralized water, steam condensate, or the like. However, any source of water which is substantially free, or contains only traces, of salts of iron, aluminum, chromium, silicon, copper, manganese, nickel, calcium, lead, antimony, or arsenic is suitable for the purposes of the invention, and regular plant process water has been employed. A very convenient source of water for diluting the magnesium nitrate solution is the acidic condensate obtained from concentrating spent magnesium nitrate solution back to dehydrating strength in magnesium nitrate concentrator 38.

It is very important that the pH of the diluted magnesium nitrate solution be between 2 and 6. At pH values below 2 an appreciable amount of contaminants remain in solution, and pH values above 6 cause precipitation of magnesium hydroxide, thus resulting in high losses of magnesium. The preferred range for pH adjustment is between 3 and 6. Solutions more acidic than a pH of 2 are conveniently adjusted to a pH value within the operative range with a basic magnesium compound such as magnesium oxide, magnesium carbonate or magnesium hydroxide. Solutions more basic than a pH of 6 are conveniently adjusted to a pH value within the operative range with nitric acid. Solutions which upon dilution are found to have a pH value within the desired range obviously require no further adjustment, and in such situations it is apparent that pH adjustment has been accomplished concurrently with the dilution step. It is also within the scope of the present invention to make suitable pH adjustments to either the water or the contaminated magnesium nitrate solution, or both, prior to the dilution step, so that upon dilution the pH of the diluted solution will be within the desired operative range.

According to one embodiment of the invention, the magnesium nitrate solution, after dilution and pH adjustment, with agitation to insure thorough mixing, is allowed to settle and cool for several hours during which the precipitated contaminants settle to the bottom of the vessel in the form of a dark brown sludge. Complete clarification of the purified dilute magnesium nitrate solution is usually attained within about 8 hours, after which the clear supernatant purified solution is separated from the settled sludge by decantation or other equivalent means. The sludge is then discarded, or may be collected and subjected to further treatment to recover residual magnesium nitrate values remaining therein.

Whereas settling and decantation have been found to be a convenient means for separting the purified magnesium nitrate solution from the precipitated contaminants, the invention is not limited in this respect, since other means of separating the purified solution from the precipitated contaminants are also effective. For example, the magnesium nitrate solution, after suitable dilution and pH adjustment, may be subjected to filtration to separate the precipitated contaminants from the purified solution. An attractive and rapid alternative method is to subject the magnesium nitrate solution, after suitable dilution and pH adjustment, to centrifugal separation.

The equipment employed for the dilution, pH adjustment and separation steps of this invention should preferably be constructed of noncorrosive material, such as stainless steel, or equivalent noncorrosive material.

The purified, clarified magnesium nitrate solution is then returned to the nitric acid concentration system.

In one embodiment of the invention the purified magnesium nitrate solution is mixed with the supply of weak aqueous nitric acid for return to the system. However, the purified magnesium nitrate solution may be returned to the nitric acid concentration system at any convenient point in the system which will insure reconcentration of the purified solution to dehydrating strength. More specifically, the purified solution may be added directly to magnesium nitrate solution concentrator 38, to any of the lines connecting the base of nitric acid concentrator 12 with magnesium nitrate solution concentrator 38, to the reboiler systems associated with either the nitric acid concentrator 12 or magnesium nitrate solution concentrator 38, or to nitric acid concentrator 12 at any convenient point between the base thereof and the point of addition of the weak aqueous nitric acid. If desired, the purified magnesium nitrate solution can be reconcentrated to dehydrating strength before returning it to the nitric acid concentration system, in which case the reconcentrated solution can be introduced directly into the feed stream of concentrated magnesium nitrate solution leading to the nitric acid concentrator, or at any other convenient point in the system.

The general nature of the invention having been set forth hereinabove, the following examples illustrate some typical and specific embodiments thereof. However, these are not to be construed as limiting the invention.

*Example 1*

One hundred seventy-five gallons of plant service water were added to a clean, conical bottom stainless steel settling tank. Sixty-four gallons of hot concentrated magnesium nitrate solution (72% by weight magnesium nitrate, and having a dirty brown color) were withdrawn from the concentrated magnesium nitrate solution feed line leading to the nitric acid concentrator at a rate of 6.4 gallons per minute and were added to the water in the settling tank to form a diluted solution containing 26.6% magnesium nitrate by weight. The pH of the diluted solution was 5.2. This diluted solution was gently agitated for 15 minutes with an air sparge to insure thorough mixing, and then it was allowed to settle for 8 hours. After settling, the clear, light yellow supernatant liquid (dilute, purified magnesium nitrate solution) was decanted, mixed with the supply of weak aqueous nitric acid in the weak aqueous nitric acid feed tank, and was reintroduced into the nitric acid concentration system mixed with the weak aqueous nitric acid over a period of several hours. The sludge at the bottom of the settling tank containing the precipitated impurities was dropped to a sludge collecting tank for further treatment to recover residual magnesium nitrate values, therefrom. A sample of the dilute purified magnesium nitrate solution reconcentrated to 70% magnesium nitrate by weight was pale yellow and almost clear as compared to the original murky dark brown salt solution before purification.

*Example 2*

One hundred seventy-five gallons of acidic condensate from the magnesium nitrate solution concentrator, containing 0.58% nitric acid by weight, were added to a clean, conical bottom stainless steel settling tank. Sixty-four gallons of hot concentrated magnesium nitrate solution (70% by weight magnesium nitrate, and having a dark brown color) were withdrawn from the concentrated magnesium nitrate solution feed line leading to the nitric acid concentrator at a rate of 6.4 gallons per minute and were added with agitation to the condensate in the settling tank to form a dilute solution containing 26.5% magnesium nitrate by weight. The pH of the diluted solution was adjusted to a value of 6 with magnesium carbonate. The diluted solution was gently air sparged for 15 minutes and allowed to settle for 8 hours. After settling, the clear, light yellow supernatant liquid (dilute, purified magnesium nitrate solution) was decanted, mixed with the supply of weak aqueous nitric acid in the weak aqueous nitric acid feed tank, and was reintroduced into the nitric acid concentration system mixed with the weak aqueous nitric acid over a period of several hours. The sludge at the bottom of the settling tank containing the precipitated impurities was dropped to a sludge collecting tank for further treatment to recover residual magnesium nitrate values therefrom. A sample of the dilute purified magnesium nitrate solution reconcentrated to 70% magnesium nitrate by weight was pale yellow and almost clear as compared to the original murky dark brown salt solution before purification.

*Example 3*

The continuity of the nitric acid concentration process was maintained by repeating Example 2 above once each day that the plant was in operation to maintain the concentration of impurities in the concentrated magnesium nitrate dehydrating solution below the level where said impurities interfere with the dehydrating function of the concentrated magnesium nitrate solution.

*Example 4*

About 300 gallons of acidic condensate from the magnesium nitrate solution concentrator, containing 0.58% $HNO_3$ by weight, were neutralized with magnesium carbonate to a pH value of 7.7. One hundred seventy-five gallons of the resulting neutralized condensate having a pH of 7.7 were added to a clean, conical bottom stainless steel settling tank. Sixty-four gallons of hot concentrated magnesium nitrate solution (70% by weight magnesium nitrate, and having a dark brown color) were withdrawn from the concentrated magnesium nitrate solution feed line leading to the nitric acid concentrator at the rate of 6.4 gallons per minute and were added with agitation to the neutralized condensate in the settling tank to form a dilute solution containing 26.5% magnesium nitrate by weight. The pH of the diluted solution was 6. The diluted solution was gently air sparged for 15 minutes and allowed to settle for 8 hours. After settling, the clear, light yellow supernatant liquid (dilute, purified magnesium nitrate solution) was decanted, mixed with the supply of weak aqueous nitric acid in the weak aqueous nitric acid feed tank, and was reintroduced into the nitric acid concentration system mixed with the weak aqueous nitric acid over a period of several hours. The sludge at the bottom of the settling tank containing the precipitated impurities was dropped to a sludge collecting tank for further treatment to recover residual magnesium nitrate values therefrom.

It is evident from the foregoing description that this invention provides an eminently satisfactory method for removing accumulated nonvolatile impurities from magnesium nitrate solution used as the dehydrating agent in the continuous concentration of nitric acid, and particularly for removing such accumulated impurities in such a manner that the continuity of operation of the nitric acid concentration system is not interrupted.

What we claim and desire to protect by Letters Patent is:

1. In the process of producing concentrated nitric acid from weak aqueous nitric acid by employing concentrated magnesium nitrate solution as the dehydrating agent, in which process nonvolatile impurities gradually accumulate in said magnesium nitrate solution to interfere with its dehydrating function, the improvement comprising withdrawing magnesium nitrate solution contaminated with nonvolatile impurities from the nitric acid concentration system, diluting the withdrawn solution with water to obtain a dilute magnesium nitrate solution containing not more than about 30% by weight of magnesium nitrate, adjusting the pH of the diluted magnesium nitrate solution to a value between 2 and 6, separating purified magnesium nitrate solution from the precipitate which forms in the resulting diluted magnesium nitrate solution of pH value between 2 and 6, and recycling the purified magnesium nitrate solution to the nitric acid concentration system.

2. In the continuous process of producing concentrated nitric acid from weak aqueous nitric acid by employing concentrated magnesium nitrate solution as the dehydrating agent, in which process nonvolatile impurities gradually accumulate in said magnesium nitrate solution to interfere with its dehydrating function, the improvement comprising withdrawing magnesium nitrate solution contaminated with nonvolatile impurities from the nitric acid concentration system, diluting the withdrawn solution with water to obtain a dilute magnesium nitrate solution containing not more than about 30% by weight of magnesium nitrate, adjusting the pH of the diluted magnesium nitrate solution to a value between 2 and 6, separating purified magnesium nitrate solution from the precipitate which forms in the resulting diluted magnesium nitrate solution of pH value between 2 and 6, and recycling the purified magnesium nitrate solution to the nitric acid concentration system, the quantity of contaminated magnesium nitrate in process of purification at any one time being not more than about 10% of the total magnesium nitrate in the nitric acid concentration system.

3. The process in accordance with claim 2 in which the magnesium nitrate solution contaminated with nonvolatile impurities is diluted with water to obtain a dilute magnesium nitrate solution containing between about 18% and about 30% by weight of magnesium nitrate.

4. The process in accordance with claim 2 in which the pH of the diluted magnesium nitrate solution is between 3 and 6.

5. The process in accordance with claim 2 in which the quantity of contaminated magnesium nitrate in process of purification at any one time is between about 3% and about 5% of the total magnesium nitrate in the nitric acid concentration system.

6. In the continuous process of producing concentrated nitric acid from weak aqueous nitric acid by employing concentrated magnesium nitrate solution as the dehydrating agent, in which process nonvolatile impurities gradually accumulate in said magnesium nitrate solution to interfere with its dehydrating function, the improvement comprising continuously withdrawing magnesium nitrate solution contaminated with nonvolatile impurities from the nitric acid concentration system, continuously diluting the withdrawn solution with water to obtain a dilute magnesium nitrate solution containing not more than about 30% by weight of magnesium nitrate, adjusting the pH of the diluted magnesium nitrate solution to a value between 2 and 6, continuously separating purified magnesium nitrate solution from the precipitate which forms in the resulting diluted magnesium nitrate solution of pH value between 2 and 6, and continuously recycling the purified magnesium nitrate solution to the nitric acid concentration system, the quantity of contaminated magnesium nitrate in process of purification at any one time being not more than about 10% of the total magnesium nitrate in the nitric acid concentration system.

7. In the continuous process of producing concentrated nitric acid from weak aqueous nitric acid by employing concentrated magnesium nitrate solution as the dehydrating agent, in which process nonvolatile impurities gradually accumulate in said magnesium nitrate solution to interfere with its dehydrating function, the improvement comprising withdrawing a quantity of magnesium nitrate solution contaminated with nonvolatile impurities from the nitric acid concentration system, said quantity of magnesium nitrate solution containing not more than about 10% of magnesium nitrate based on total magnesium nitrate in the nitric acid concentration system, diluting the withdrawn solution with water to obtain a dilute magnesium nitrate solution containing not more than about 30% by weight of magnesium nitrate, adjusting the pH of the diluted magnesium nitrate solution to a value between 2 and 6, separating purified magnesium nitrate solution from the precipitate which forms in the resulting diluted magnesium nitrate solution of pH value between 2 and 6, recycling the purified magnesium nitrate solution to the nitric acid concentration system, and maintaining the continuity of the nitric acid concentration process by repreating the above stated process steps at sufficiently frequent intervals to maintain the concentration of impurities in the concentrated magnesium nitrate dehydrating solution below the level where said impurities interfere with the dehydrating function of said concentrated magnesium nitrate solution.

References Cited in the file of this patent

UNITED STATES PATENTS

| | | |
|---|---|---|
| 1,310,383 | Auld et al. | July 15, 1919 |
| 2,463,453 | Beardsley | Mar. 1, 1949 |
| 2,794,703 | Kindsvater et al. | June 4, 1957 |
| 2,860,035 | Mandelik | Nov. 11, 1958 |

FOREIGN PATENTS

| | | |
|---|---|---|
| 510,765 | Canada | Mar. 8, 1955 |